United States Patent [19]

Entenman

[11] 4,217,551

[45] Aug. 12, 1980

[54] PHASE MODULATED DATA TRANSMISSION SYSTEM

[75] Inventor: Alan Entenman, Hicksville, N.Y.

[73] Assignee: Intech Laboratories, Inc., Bohemia, N.Y.

[21] Appl. No.: 818,394

[22] Filed: Jul. 25, 1977

[51] Int. Cl.² ........................... H04B 1/16; H03D 3/00
[52] U.S. Cl. ......................................... 375/88; 329/110
[58] Field of Search ............... 325/320; 178/67, 68; 329/50, 104, 110; 328/109, 155

[56] References Cited

U.S. PATENT DOCUMENTS

| 2,904,683 | 9/1959 | Meyer | 329/104 |
|---|---|---|---|
| 3,764,926 | 10/1973 | Rypinski, Jr. | 329/104 |
| 3,794,928 | 2/1974 | Stump | 325/320 |
| 3,843,931 | 10/1974 | Sarkilahti | 329/104 |
| 3,883,806 | 5/1975 | DeLong | 325/320 |
| 3,906,376 | 9/1975 | Bass | 329/104 |
| 3,970,945 | 7/1976 | Knapp | 329/104 |
| 3,993,956 | 11/1976 | Gilmore | 325/320 |
| 4,013,967 | 3/1977 | Fassbind | 329/104 |

Primary Examiner—Robert L. Richardson
Assistant Examiner—Michael A. Masinick
Attorney, Agent, or Firm—Hopgood, Calimafde, Kalil, Blaustein & Lieberman

[57] ABSTRACT

A data transmission system, particularly useful for transmission of computer data by radio frequency cables, makes use of a phase demodulator which eliminates the usual requirement for a coherent local oscillator for use in the demodulation process. The demodulator performs a phase-shifting operation on a phase modulated signal to arrive at an unmodulated carrier signal. The unmodulated carrier is sustained by use of a resonant circuit and used to demodulate the phase modulated signal.

12 Claims, 8 Drawing Figures

PHASE MODULATED DATA TRANSMISSION SYSTEM

BACKGROUND OF THE INVENTION

This invention relates to systems for transmitting and receiving data by means of phase modulated RF signals.

The use of digital computers for business purposes can be greatly expanded where data can be transferred from one computer to another by the use of communications links. Very often such computer data is transmitted by means of tones over ordinary telephone lines. Telephone lines have a limited modulation bandwidth and may be subject to noise or other problems which renders them inappropriate for high speed data transmissions.

In addition to telephone lines, many localities are now equipped with cable television networks. Such networks are primarily adapted for transmission of television signals from a central location, called the "head end" of the network, to subscribers located at various locations in a geographic area. In addition to the "downstream" transmission of television signals, it is possible to provide both "upstream" and "downstream" transmission of data signals, so that the signals can be transferred between computers attached to terminals of the network. In such systems, data is transmitted upstream at a relatively low RF frequency, upon arriving at the system head end the data bearing signal is translated into a higher frequency channel, corresponding to an unused television channel, for transmission downstream on the cable to all of the subscriber terminals. In this way, data can be transferred from a first computer, located at one cable network terminal, up to the system head end and then downstream at a higher frequency to another computer located at another cable network terminal. This arrangement facilitates the interconnection of remotely located computers used for a common purpose, for example the computers located at the central office and at branch offices of a banking institution.

In other applications, data may be transferred by means of exclusively dedicated cable transmission lines, for example between computers located at various locations within an industrial plant. Also data may be transmitted at RF frequencies over long distances, for example between computers located in one city, via satellite relay, to computers located in another city. It should be recognized that the term "data" as used herein is not limited to computer generated signals, but is equally applicable to digitized voice, video or teletype signals.

All of the above described systems for transmitting data by means of an RF communications link require that the data be modulated onto an RF carrier signal and demodulated at the receiving terminal, so that it can be converted into a suitable format for use by the receiving computer. The devices for modulating and demodulating RF signals with data are commonly known as modems. Several schemes for modulating RF carriers with data are known, including pulse amplitude modulation, wherein the amplitude of the RF carrier during a selected interval is determined by the data state of the data to be transmitted; pulse duration modulation, wherein the length of a transmitted RF pulse is used to represent a particular data state; pulse code modulation, wherein pulses are transmitted in a code sequence to represent data states; frequency hop modulation, wherein different data states are represented by different transmitted frequencies; and phase-shift modulation, wherein different phase states of the RF carrier represent different data conditions. The present invention is related primarily to data transmission systems which use a phase-shift modulated carrier.

The generation of phase-shift modulated signals from logic signals is easily achieved by use of a modulating apparatus such as shown in FIG. 1. This circuit is useful for generating binary phase-shift modulated signals wherein data states are represented by the phase of the carrier which is either 0° or 180°. In this circuit, the CW output from oscillator 10 is modulated in mixer 14 by positive or negative voltage data representative signals supplied by source 12. The output of mixer 14 may be supplied to output 18 by amplifier 16. FIG. 2 shows typical data signals which may be applied to mixer 14 to result in a binary phase-shift modulated signal, which is shown in FIG. 3. For simplicity in illustration, the FIG. 3 signal is shown having a frequency equal to twice the data rate. This frequency selection can result in phase-shifts occurring at null crossings as illustrated. Those skilled in the art will recognize that usually the carrier frequency is significantly higher than the data rate, and phase shifts may occur at other than the zero crossings of the RF carrier.

One problem with the use of phase-shift modulated signals arises out of the need to reconstruct a phase-coherent unmodulated carrier in the receiver for use in demodulating the received signal. Most prior art demodulators makes use of a phase-locked loop in order to provide a regenerated carrier for use in demodulation. The phase-locked loop makes use of a voltage controlled oscillator whose frequency and phase is regulated by a locally generated control signal. The control signal is derived from a comparison of the oscillator output with the received signal. FIG. 4 shows a typical prior art receiver which makes use of a phase-locked loop. The received signal is supplied to terminal 20 and applied to a squaring circuit 22 to remove the binary phase modulation on the signal. The squared signal is at twice the original frequency and is filtered by band pass filter 26 and applied to a phase comparator 28 which determines the phase difference between the squared signal and the signals generated by local oscillator 30 which operates at twice the frequency of the received signal. A phase-difference error signal is provided at the output of phase comparator 29, filtered by loop filter 32, and used to control the oscillations of voltage controlled local oscillator 30. The output of voltage controlled oscillator 30 is halved in divider 31 and used as a local oscillator signal to demodulate the received phase modulated signal in phase detector 24. Variations on the phase locked loop of FIG. 4 are known in the art. For example, the Costas loop makes use of a quadrature output signal from voltage controlled oscillator 30, which is mixed the the received modulated signal to generate an error signal. The correct phase for the error signal is determined by reference to the received data.

From the foregoing discussion, it should be recognized that phase shift modulated signals may be easily generated by use of a simple modulator circuit, such as the FIG. 1 circuit, but, according to the prior art, complex and expensive circuits, are required to achieve demodulation of phase-shift modulated signals.

It is therefore an object of the present invention to provide a new and improved demodulator for use with phase-shift modulated RF signals.

It is a further object of the present invention to provide such a demodulator which eliminates the need for a phase-locked local oscillator for the regeneration of the unmodulated carrier.

SUMMARY OF THE INVENTION

In accordance with the invention, there is provided apparatus for demodulating a phase shift modulated carrier to derive data representative signals. The apparatus includes means responsive to data representative signals, for phase shifting the modulated carrier to derive an unmodulated carrier. Means are provided for sustaining the unmodulated carrier during phase changes of the modulated carrier. Finally, there is provided a phase detecting means, responsive to the sustained unmodulated carrier and the modulated carrier for generating the data representative signals.

The apparatus is particularly useful with binary phase shift modulated signals wherein the phase shifting means may be a first mixer. In this case, the phase detecting means can be a second mixer. The means for sustaining the unmodulated carrier during phase changes of the modulated carrier is usually a resonant circuit. In order to provide an initial phase lock of the receiver, the system may include a detector for providing an indicating signal indicating the initiation of a received RF carrier signal. The indicating signal may be used to provide an initial data representative signal of a selected polarity and duration to initiate phase locking of the demodulator circuit. The indicating signal may also be used to block data output from the demodulator while phase-lock of the demodulating circuit is being achieved. In a further aspect of the invention, there may be provided means for detecting the loss of phase lock of the receiver demodulator. In most applications of a phase modulated signal, the modulated signal is representative of one of two data states for the majority of data intervals. In this case, an inverting circuit may be provided for determining whether or not the majority of data representative signals are representative of one of the data states and, if not, can provide a data inversion for changing the data output.

In accordance with further refinements of the invention, the demodulator may be incorporated into a receiver which includes frequency converting heterodyne means, and detection of the modulated data signals may be performed at an intermediate frequency. The receiver and detecting circuit may be combined with a transmitting circuit to provide a complete data modem. When used in a cable system, the transmitted and received signals would be at widely separated carrier frequencies.

For a better understanding of the present invention, together with other and further objects, reference is made to the following description, taken in conjunction with the accompanying drawings, and its scope will be pointed out in the appended claims.

DESCRIPTION OF THE INVENTION

Figure 2:
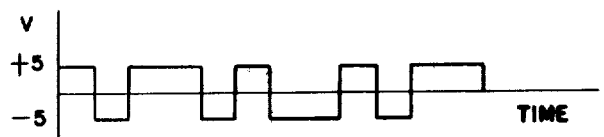
FIG. 2 illustrates a data signal useable in the apparatus of FIG. 1.
Figure 3:
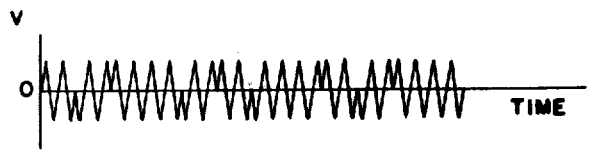
FIG. 3 is a graph illustrating the signal format of the output of the FIG. 1 circuit.
Figure 4:
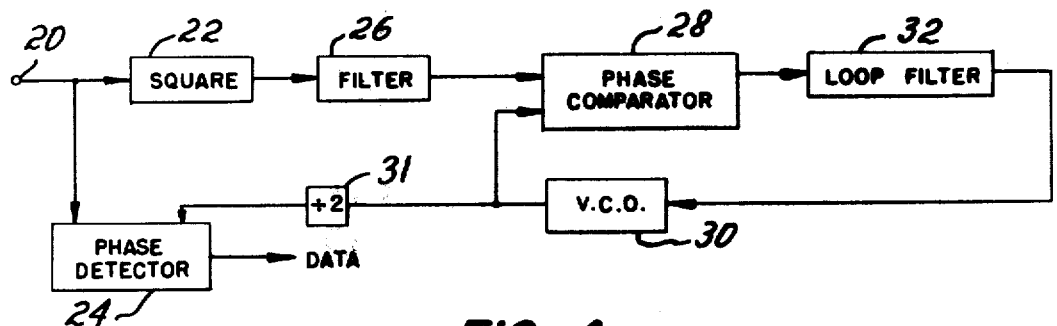
FIG. 4 is a block diagram illustrating a receiver for a phase shift modulated signal in accordance with the prior art.
Figure 5:
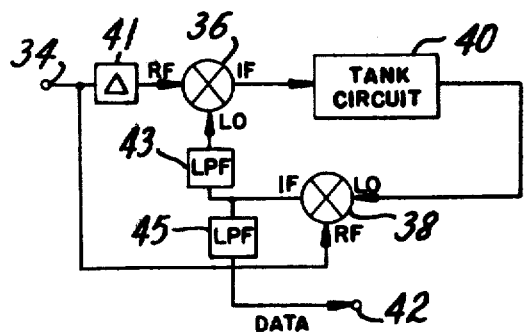
FIG. 5 is a block diagram illustrating a phase shift demodulator in accordance with the present invention.

FIG. 5 is a block diagram illustrating the basic components of the demodulator used in the present invention. Phase-shift modulated signals are supplied to input terminals 34 and thereafter coupled to the inputs of mixers 36 and 38. The output of first mixer 36 is coupled to a tank circuit 40, which is a relatively high Q resonator. The resonator circuit is coupled to second mixer 38. The output of mixer 38, which is filtered by low pass filter 45, is a data representative output signal which is also supplied to mixer 36. When a phase-shift modulated signal, for example, the binary phase-shift modulated signal illustrated in FIG. 3, is supplied to input 34, it is coupled to mixers 36 and 38. The output of mixer 38 is a data representative signal such as illustrated in FIG. 2. The data representative signal is supplied to mixer 36 so that I.F. output of mixer 36 consists of the original carrier signal in an unmodulated form, which is supplied to tank circuit 40. Tank circuit 40 provides sustained continuous-phase carrier oscillations when the received signal supplied to terminal 34 undergoes phase reversals and thus provides a continuous carrier signal to mixer 38. When a phase reversal occurs in the incoming signal supplied to terminal 34, the data condition of the output of mixer 38, which is supplied to the local oscillator input of mixer 36, is reversed. Thus, the output of mixer 36 is reversed in phase twice, once when the received signal is reversed and once when the data signal reverses. Thus, the same phase of carrier is supplied to tank circuit 40 after reversal of the phase of the received signal.

If the phase modulated signal is a binary phase signal which initially has a phase representative of a positive data signal, and there is supplied a positive data signal to the local oscillator input port of mixer 36, the I.F. output of mixer 36 will be an in-phase carrier signal, which is supplied to tank circuit 40. When the signal supplied to input terminal 34 reverses in phase, the initial tendency is for there to be a phase reversal in the output of mixer 36. Tank circuit 40 sustains oscillations at the original in-phase condition for a period which is sufficiently long to allow the reverse phase condition of the received signal to reverse the output of mixer 38. When the output of mixer 38 reverses to a negative data representative signal, the output of mixer 36 is also reversed causing the output of mixer 36 to be an in-phase carrier signal. During the phase reversal and re-reversal of the output of mixer 36, tank circuit 40 sustains the original phase of the carrier supplied to mixer 38.

A low pass filter 43 is advantageously provided between mixer 38 and mixer 36. This filter removes high frequency components from the output of mixer 38 and provides a clean signal to mixer 36. Because of the inherent delay of low pass filter 43, it may be advantageous to provide a delay 41 at the RF input to mixer 36 so that on the occurrance of a phase change in the received signal the phase changed signal arrives at mixer 36 at approximately the same time as the changed data signal. Delay 41 may be implemented by use of a transmission line delay, acoustic delay line or digitally, by use of a shift register.

Low pass filter 45 is provided to remove high frequency signal components from the output data signal. Those skilled in the art will recognize that filters 43 and 45 may be combined into a single filter at the output of mixer 38.

As is evident from the above description, the demodulating circuit of FIG. 5 effects a demodulation of a binary phase modulated signal without the use of a phase-locked local oscillator. The output of mixer 38 is a continuous data representative signal which is the desired output from the demodulator circuit. This data signal may be tapped at output terminal 42 for use in data processing or other equipment following suitable signal format translation.

According to the principles of the invention, applicable to any phase-shift modulated signal, the function performed by mixer 36 is to phase shift the received signal so that the output of the phase shifting means is an unmodulated carrier signal. A tank circuit 40 is provided to sustain the carrier oscillations during transient phase reversals, or phase changes, of the phase-shift modulated signal. The function performed by mixer 38 is essentially a phase demodulation function, which makes use of the sustained unmodulated carrier output from tank circuit 40 to demodulate the modulated received signal.

Figure 6:
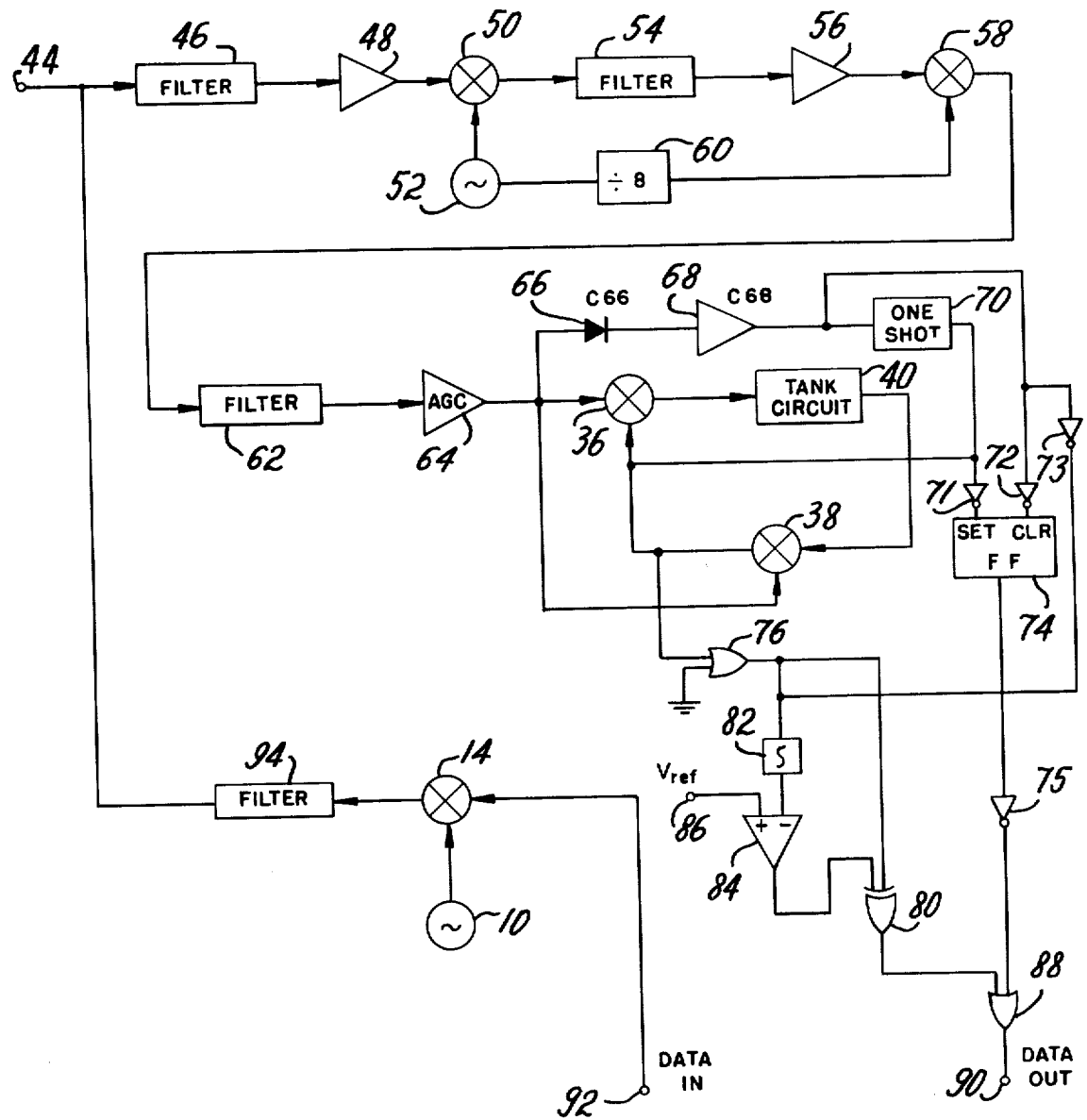
FIG. 6 is a block diagram illustrating a complete modem in accordance with the present invention.

Those skilled in the art will recognize that the demodulating scheme illustrated in FIG. 5 can be carried out at other than the transmitted carrier frequency. In most cases, it is appropriate to provide heterodyne circuits to reduce the carrier frequency to a selected intermediate frequency before performing the demodulation function. FIG. 6 is a block diagram of a modem for transmitting and receiving binary phase-shift modulated signals. Transmitted data is provided to terminal 92 and used to modulate the output of an oscillator 10 in mixer 14. A filter 94 is used to couple the modulated output carrier to a terminal 44, which may be connected to an antenna or to an RF cable system. A filter 46 separates the received signals from the transmitted signals. For example, in a cable system, the transmitted signals may be at a low frequency, for example 10 MHz, while received signals may be at a frequency of 50 MHz or higher. A low-noise RF amplifier 48 is provided to amplify the received signals. The output of amplifier 48 is provided to mixer 50 to effect a first frequency conversion. A local oscillator 52 has its output supplied to mixer 50. The first intermediate frequency signal is filtered in filter 54 and amplified by amplifier 56 in a manner which is customary in heterodyne receivers. A second mixer 58 is supplied by a local oscillator signal which consists of the output of oscillator 52 which has been frequency divided by eight to achieve a lower local oscillator frequency. A third filter 62 separates the appropriate data band from the second intermediate frequency output of mixer 58 and an automatic gain control amplifier 64 provides the limiting function. The output of amplifier 64 is supplied to mixers 36 and 38 whose function has been described with reference to FIG. 5.

The FIG. 6 circuit also includes a detector 66, which detects the presence of an intermediate frequency signal at the output of amplifier 64. Amplifier 68 provides a "carrier-on" indicating signal, which represents the presence of a carrier at the output of amplifier 64. When a signal is first received, the initialization of the indicating signal causes one-shot circuit 70 to provide an output pulse which is supplied to mixer 36 in order to initialize the operation of the demodulating circuit. In most cases, the signal transmitter is arranged to provide a continuous unmodulated burst, for example, 100 microseconds long, at the initiation of a transmission. During at least a portion of this burst, for example 60 microseconds, one-shot circuit 70 provides an output as an initial data signal to mixer 36 and enables the initiation of oscillations in tank circuit 40. The initiation of oscillations in tank circuit 40 then provides a signal to mixer 38, which when combined with the received initial transmission burst provides the same initial data signal to mixer 36. Therefore, the circuit continues to operate when the output of one-shot circuit 70 goes to zero. Following the end of the initializing pulse, the demodulator will demodulate the received signals in the ordinary manner.

The initiation of the carrier-on indicating signal is also used to prevent the data output from the demodulator from being supplied to the receiving computer or other equipment during the initiation of the receiving circuit. Therefore, the output pulse from one-shot 70 is provided in inverted form to the set input of set-clear flip-flop 74 by inverter 71. The carrier-on indicating signal is also provided to the clear input of flip-flop 74 by inverter 72. When the output from one-shot 70 goes to zero, after 60 microseconds, a positive going signal is supplied by inverter 71 to the set terminal of flip-flop 74. This causes flip-flop 74 to provide a positive signal to inverter 75, and therefore a zero signal to OR gate 88. Prior to the positive output from flip-flop 74, inverter 75 provides a "one" signal to output gate 88, so that the data at output terminal 90 is always in a "one" condition. When the carrier is no longer present, the absence of a carrier-on indicating signal, causes inverter 72 to supply a "one" to the clear terminal of flip-flop 74, clear the flip-flop, and cause inverter 75 to supply a "one" to output gate 88, blocking the supply of further data to the computer.

Figure 1:
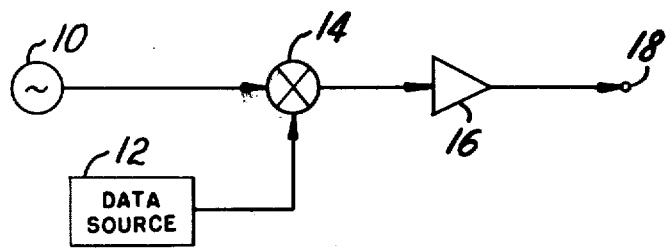
FIG. 1 is a block diagram showing a phase shift modulator in accordance with the prior art.

In a phase-shift modulating circuit, such as that illustrated in FIG. 1, data may be transmitted in either a synchronous or an asynchronous mode. If data is transmitted in synchronous mode, the data representative condition is the presence or the absence of phase-shift between precisely determined time intervals in the signal. If the data is transmitted asynchronously an "in-phase" or "out-of-phase" condition of the carrier is representative of a "one" or zero data condition. In this type of operation, no data clock synchronization is required, but the carrier reconstructed in the receiver must be synchronized in phase to the oscillator at the transmitter. Thus, the initialization of tank circuit 40 provided by one-shot 70 as described above causes the output of tank circuit 40 to be in the "in-phase" condition. It is possible that during operation of the demodulator, particularly in the presence of a noisy signal, tank circuit 40 could inadvertently have its oscillations inverted and therefore the output data could be representative of the inverse of the transmitted data. In order to prevent the continuous reception of invalid data, the circuit elements 76, 80, 82, and 84 are provided to invert the data output, in the event tank circuit 40 has the improper data carrier phase. The presence of an improper carrier phase can be determined by the fact that transmitted data is usually representative primarily of either a "one" or a "zero". This results from the fact that during intervals when no data is being transmitted, the transmitter continuously sends a signal representative of a selected data condition. Integrating circuit 82 is arranged to average the data representative signals and detect the existence of substantially more signals in one condition than in the other. If the data representative signals which are supplied to integrator 82 should be primarily representative of "zero" and be equal to zero volts, the average output of integrator 82 should be below a selected voltage which is supplied to reference terminal 86. If the output of the integrator 82 rises above the reference voltage, it is representative of a condition where most of the data supplied is representative of a "one" data condition. Differential amplifier 84 detects this abnormal condition, and supplies a signal to exclusive OR gate 80 which causes an inversion of the output data signal. OR gate 76 has one input terminal grounded and provides isolation between the output of mixer 38 and inverter 73. Inverter 74 is provided with the "carrier-on" indicating signal and sets the integrator 82 in an initial "zero" condition when the carrier is initially detected.

Figure 7:
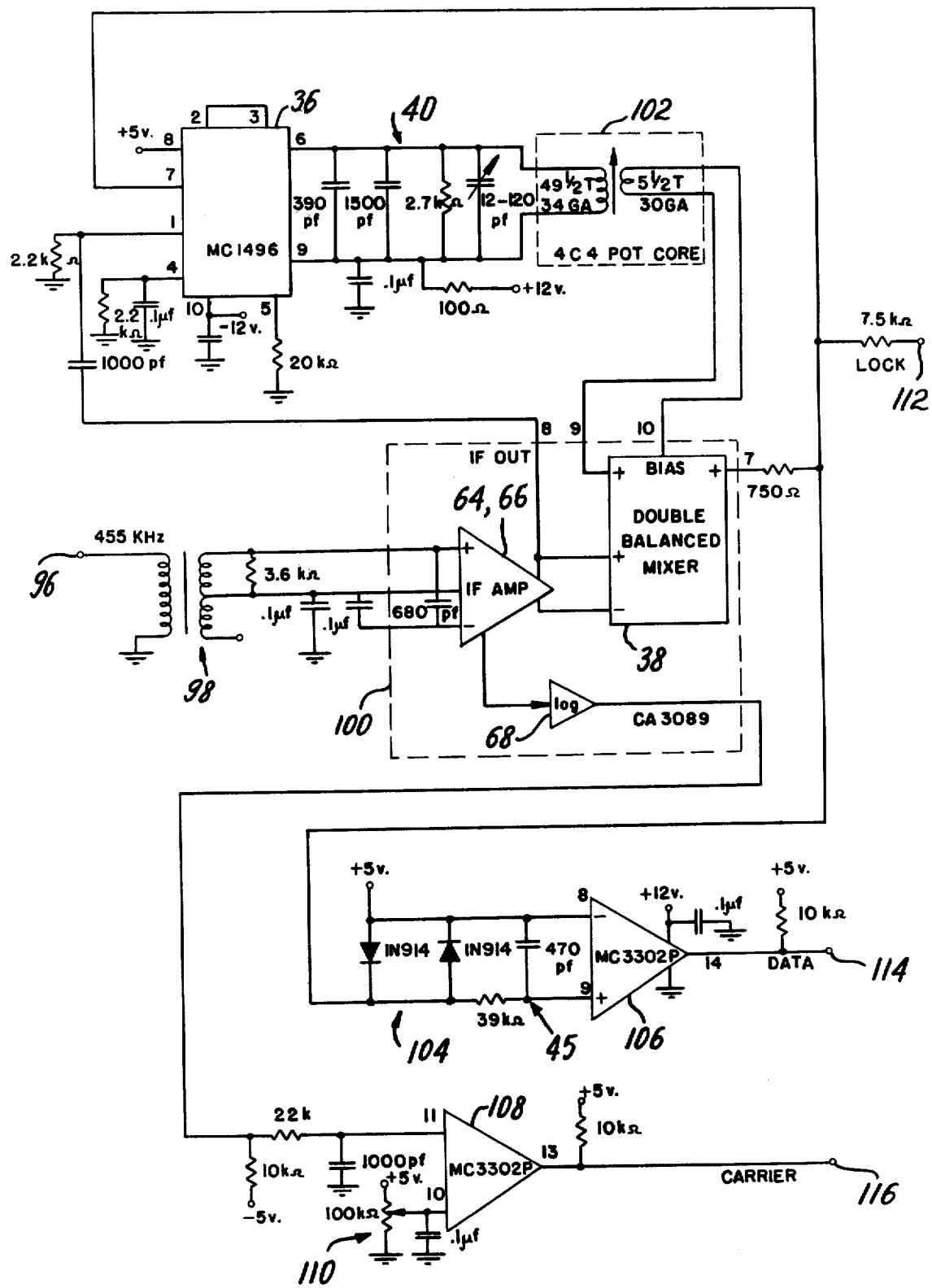
FIG. 7 is a schematic diagram of the demodulator of the FIG. 6 modem.
Figure 8:
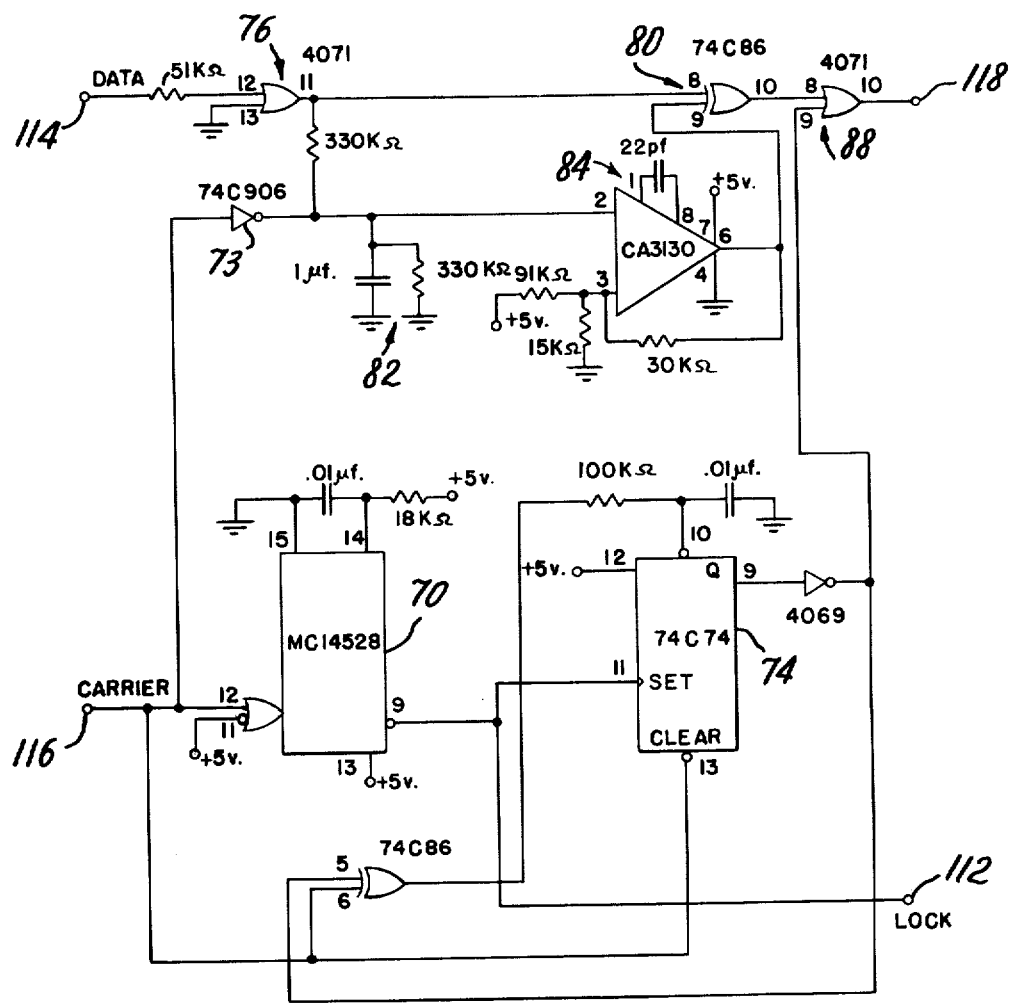
FIG. 8 is a schematic diagram of the data control circuits in the FIG. 6 modem.

FIGS. 7 and 8 are detailed schematic diagrams of the demodulating portion of the modem of FIG. 6. This demodulator is suitable for receiving binary phase-shift modulated signals at data rates up to 20 KHz. The circuit of FIG. 7 includes an input terminal 96 to which phase-shift coded signals at an intermediate frequency of 455 KHz are supplied. Transformer 98, which forms a part of intermediate frequency filter 62, is used to convert the supplied signal to a balanced form, which is supplied to integrated circuit 100. Integrated circuit 100 contains amplifier 64, detector 66, mixer 38, and amplifier 68. Mixer circuit 38 is a double balanced mixer which also includes an output signal amplifier. Another integrated circuit is used for mixer 36, and that circuit also includes output amplification. Tank circuit 40 is formed by a combination of fixed and variable capacitors, a resistor, and transformer 102. Transformer 102 provides the output coupling for tank circuit 40 to mixer 38. The data output from mixer 38 is supplied to amplifier 106. Diodes 104 at the input to amplifier 106 limit the input signal. Low pass filter 45 is formed by the capacitor and resistor at the input to amplifier 106. Filter 43 and delay 41 are not provided. The carrier detection signal is amplified by log amplifier 68 on integrated circuit 100 and is supplied to differential amplifier 108, which is also supplied with a reference voltage from potentiometer 110. The output of differential amplifier 108 is a logic signal indicating that a carrier is or is not present in the receiver. Terminals 112, 114 and 116 are used to connect the circuit of FIG. 7 to the corresponding terminals on the circuit of FIG. 8.

The FIG. 8 diagram illustrates a set of integrated circuits and discrete components which perform the data output inverting and blocking functions, which are carried out in gates 80 and 88 as described above. Also included in the circuit of FIG. 8 is an integrated circuit 70 to provide the single shot 60 microsecond pulse for initiating the phase of tank circuit 40 when a transmission has been initially received.

Many variations of the circuits described herein will be evident to those skilled in the art. In addition to the modifications discussed above with respect to signals other than bi-phase modulated signals, it is possible to implement the demodulator of the invention by the use of digital rather than analog components. In order to achieve digital demodulation, the intermediate frequency signal is converted to a square wave. The mixers used in FIG. 5 are replaced with exclusive-OR gates. The tank circuit may be a conventional resonant filter circuit with D to A and A to D converters, or a clock which is triggered and stabilized by the output of the exclusive OR gate which replaces mixer 36. With respect to either the digital or the analog implementation of the circuit of FIG. 5, it should be noted that the circuit is a bi-stable circuit and a steady state condition can exist with the data output representing either a "one" or a "zero". A phase change in the received signal effects a change in the state of the demodulation circuit so that the data output is changed.

While there have been described what are believed to be the preferred embodiments of the invention, those skilled in the art will recognize that other and further modifications may be made thereto without departing from the spirit of the invention, and it is intended to claim all such modifications as fall within the true scope of the invention.

I claim:

1. Apparatus for demodulating a phase-shift modulated carrier to derive data representative signals, comprising:

means, responsive to said data representative signals, for phase shifting said modulated carrier for deriving an unmodulated carrier;

means for sustaining said unmodulated carrier during phase changes of said modulated carrier;

and phase detecting means, responsive to said sustained unmodulated carrier and said modulated carrier, for generating said data representative signals, wherein said unmodulated carrier deriving means includes means connected to said phase detecting means and responsive to said data representative signals and said modulated carrier for selectively changing the phase of said modulated carrier dependent upon the value of said data representative signal for deriving said unmodulated carrier.

2. Apparatus as specified in claim 1 wherein said sustaining means comprises a resonant circuit.

3. Apparatus as specified in claim 1 wherein said modulated carrier comprises a phase-shift modulated carrier and wherein said means for phase shifting said modulated carrier comprises a first mixer.

4. Apparatus as specified in claim 3 wherein said phase detecting means comprises a second mixer.

5. Apparatus as specified in claim 4 wherein said sustaining means comprises a resonant circuit.

6. Apparatus as specified in claim 1, wherein said modulated carrier has a first phase condition representative of a fixed data signal condition and a second phase condition representative of a second, inverted data signal condition, wherein said carrier is more likely to have said first phase condition, and wherein there is further provided means, responsive to said data representative signals, for providing a control signal when said data representative signals are primarily representative of said second data signal condition, and means, responsive to said control signal, for inverting said data representative signals.

7. Apparatus as specified in claim 6 wherein said means for providing said control signal comprises integrating means responsive to said data representative signals for generating an average signal and a differential amplifier responsive to said average signal and a reference signal for providing said control signal.

8. Apparatus for demodulating a phase-shift modulated carrier to derive data representative signals, comprising:
   means, responsive to said data representative signals, for phase shifting said modulated carrier to derive an unmodulated carrier;
   means for sustaining said unmodulated carrier during phase changes of said modulated carrier;
   and phase detecting means, responsive to said sustained unmodulated carrier and said modulated carrier, for generating said data representative signals;
   wherein there is additionally provided means for detecting said modulated carrier to provide an indicating signal, and means responsive to said indicating signal for providing an initial data representative signal to said phase shifting means.

9. Apparatus as specified in claim 8 wherein said means for providing said initial data representative signal comprises means for providing said signal for a selected time after the start of said indicating signal.

10. Apparatus as specified in claim 9 wherein there is additionally provided a data output gate for controlling output of said data representative signals, said output gate being responsive to said initial data representative signal to block output of said data for said selected period.

11. A receiver for a binary phase-shift modulated signal, comprising:
   heterodyne means, responsive to said modulated signal, for producing a phase-modulated intermediate frequency signal;
   a first mixer, responsive to said modulated intermediate frequency signal and a data signal for generating an unmodulated intermediate frequency signal;
   means for sustaining said unmodulated intermediate frequency signal during phase change of said modulated intermediate frequency signal;
   and a second mixer, responsive to said sustained unmodulated intermediate frequency signal and said modulated intermediate frequency signal for generating said data signal;
   wherein said unmodulated intermediate frequency signal generating means includes means connected to said second mixer and said heterodyne means and responsive to said data signal and said phase-modulated intermediate frequency signal for selectively changing the phase of said phase-modulated intermediate frequency signal dependent upon the value of said data signal for deriving said unmodulated carrier.

12. A receiver as specified in claim 11 wherein said heterodyne means include first and second frequency converters responsive to first and second local oscillator signals, and wherein there is provided a frequency divider for deriving said second local oscillator signal from said first local oscillator signal.

* * * * *